United States Patent

Nishio

Patent Number: 5,209,613
Date of Patent: May 11, 1993

[54] DIAMOND TOOL AND METHOD OF PRODUCING THE SAME

[75] Inventor: Noriyuki Nishio, Sendai, Japan

[73] Assignees: Nihon Cement Co. Ltd., Tokyo; Nihon Ceratec Co. Ltd., Sendai, both of Japan; part interest to each

[21] Appl. No.: 772,241

[22] Filed: Oct. 7, 1991

[30] Foreign Application Priority Data

May 17, 1991 [JP] Japan .................. 3-141478

[51] Int. Cl.⁵ .............................. B23B 27/20
[52] U.S. Cl. .......................... 407/119; 51/308; 408/145; 501/90
[58] Field of Search .............. 407/114–116, 407/119, 118; 408/144, 145; 51/307, 308, 309, 293; 501/90

[56] References Cited

U.S. PATENT DOCUMENTS

| | | | |
|---|---|---|---|
| 4,241,135 | 12/1980 | Lee et al. | 51/308 X |
| 4,504,284 | 3/1985 | Ohno | 51/308 X |
| 4,789,385 | 12/1988 | Dyer et al. | 51/308 X |
| 5,011,515 | 4/1991 | Frushour | 51/309 X |

FOREIGN PATENT DOCUMENTS 0175775 10/1982 Japan .................. 407/119
3-149107 6/1991 Japan .

Primary Examiner—Steven C. Bishop
Attorney, Agent, or Firm—Jacobson, Price, Holman & Stern

[57] ABSTRACT

A diamond tool which generates little vibrations, can be used in high temperature environments and can be produced with excellent yield has at least a shank portion (2) in contact with a diamond chip (1) and formed from a reaction-sintered silicon carbide material having a thermal expansion coefficient close to that of the diamond chip by using a diamond granule, and a method for producing the diamond tool which comprises contacting a diamond chip with an ingredient layer mixed with a diamond granule and a carbonaceous source, placing a metallic silicon powder on the surface of the layer, and then reaction-sintering it in vacuum or in a non-oxidizing atmosphere by heating, thereby forming a reaction-sintered silicon carbide material having a coefficient of thermal expansion close to that of a diamond chip, at least, in the shank portion at which a diamond chip is in contact.

20 Claims, 2 Drawing Sheets

DIAMOND TOOL AND METHOD OF PRODUCING THE SAME

BACKGROUND OF THE INVENTION

This invention relates to a diamond tool used in a field where the generation of vibrations has to be avoided during processing as well as in a field where thermal resistance is required, and to a method for producing the same.

There have existed a variety of diamond tools which utilize the abrasion resistance of diamond, such as diamond bite, diamond dressers, diamond wire drawing dies, diamond surgical knives, etc.

These tools are generally formed by bonding a diamond chip to a shank of metal, such as stainless steel, by a powder metallurgical or active metal method or the like.

However, the above-mentioned tools formed by conventional bonding techniques suffer such problems as follows:

For example, in the case of machining a soft material, such as aluminum, brass, and oxygen-free copper, processing with precision cannot be achieved because of vibrations of the tool generated during processing. To solve this problem, the shank may be composed of highly rigid ceramics. At present, however, no appropriate technique has been established for bonding a diamond chip to a ceramic shank through a junction having similarly high rigidity. It has therefore been difficult to produce a diamond tool having a shank composed of highly rigid ceramics.

Also, for use under high temperature conditions, for example, from 1300° C. to 1400° C., because the thermal resistance of a shank itself and that of a junction between the shank and diamond are insufficient, the precision of processing a workpiece cannot be assured, or the tool cannot at all be used. For improving thermal resistance, it is possible to produce a shank from ceramics having thermal resistance, but as described above no suitable technique for bonding diamond with a ceramic shank has yet been established.

Thus, as a result of various experiments and research, the inventor devised to form at least the shank portion of the diamond tool which is in contact with a diamond chip using a reaction-sintered silicon carbide material. The tool produced according to this method has been confirmed to have better thermal resistance and effectively reduce vibrations during its use.

However, the thermal expansion coefficient of the diamond chip is not necessarily sufficiently close to that of thermal expansion of the shank portion formed of the reaction-sintered silicon carbide material. Consequently, in some cases stress attributed to the difference between the thermal expansion coefficients of the diamond chip and ceramics shank remains at the junction. This residual stress is responsible for cracks and exerts negative influence on the product yield and the life of products.

BRIEF SUMMARY OF THE INVENTION

An object of this invention is to provide a diamond tool which does not generate much vibrations and which can withstand use in high temperature environments and which also has a long life, and to provide a method for producing such diamond tool with excellent yield.

The applicant has tried a reaction-sintered silicon carbide material mixed with diamond granules as a shank material in order to achieve the object, and successfully developed a ceramics shank material having a thermal expansion coefficient close to that of a diamond chip to complete this invention.

Namely, the gist of the invention resides in a diamond tool having a shank portion, at least a portion of which is in contact with a diamond chip, formed from a reaction-sintered silicon carbide material mixed with diamond granules and having a thermal expansion coefficient close to that of the diamond chip.

Also, the method for producing the diamond tool comprises burying a diamond chip in or contacting it with an ingredient layer (powder layer or compact) mixed with diamond granules and a carbon source, placing metallic silicon powder on the surface of the layer, and then reaction-sintering it by heating a vacuum or in a non-oxidizing atmosphere, thereby forming a reaction-sintered silicon carbide material having a thermal expansion coefficient close to that of the diamond chip, at least, in the shank segment which is in contact with the diamond chip.

In the following, the present invention will be explained in more detail.

Here, as the above-mentioned diamond chip, either of single diamond composed of single crystal or sintered diamond can be used.

Also, the reaction-sintered silicon carbide material may be made from, as ingredients, graphite, carbon black and a carbonaceous organic compound, such as phenol resin, which converts to a carbon source upon heating. These ingredients are, if necessary, mixed with silicon carbide granules and heated in a vacuum or in a non-oxidizing atmosphere. Then, the ingredient layer is permeated with molten silicon so that the silicon reacts with the carbon source in the ingredient layer to newly form silicon carbide and to form a combined material, thus obtaining the reaction-sintered silicon carbide material.

Diamond granules are mixed with these ingredients, which can form the reaction-sintered silicon carbide material. As will be described below, this mixing makes it possible to make the coefficient of thermal expansion of a shank material after reaction sintering close to that of a diamond chip.

The amount of diamond granule to be mixed into the reaction-sintered silicon carbide material should be as large as possible. This is because if this amount is too small, the thermal expansion coefficient of the material will become different from that of the diamond chip and bonding becomes difficult. Numerically speaking, for example, the diamond granules preferably occupy more than 85% by weight of the ingredient layer after the mixing (in the case of mixing a carbonaceous organic compound such as phenol resin, weight after carbonization is calculated as the mixing weight).

The ingredient layer mixed with the diamond granules and the carbon source may be a powdery layer or a compact. If it is a compact, the product of a near net shape can be obtained by processing it beforehand in a shank shape.

In either case, the ingredient layer is preferably placed in a molding box whose surface is composed of boron nitride and whose inside can be closely fitted with the shank. This is because the removal of excess silicon after reaction sintering can be simplified.

A diamond chip is arranged so as to contact with the ingredient layer (powder layer or compact), and then metallic silicon powder is placed in contact with the ingredient layer. The metallic silicon powder is preferably enclosed by the mold box whose surface is made of boron nitride. This is because when the silicon powder melts on the succeeding heating it can be prevented from flowing out to the outside.

Then the ingredient layer is directly heated in a vacuum or in a non-oxidizing atmosphere. This results in the melting of the metallic silicon powder and in its permeation into the ingredient layer. The permeated silicon is allowed to react directly with carbon to form silicon carbide (reaction: $C+Si \rightarrow SiC$).

Thus, a joined body between the diamond chip and the thus produced reaction-sintered silicon carbide material can be obtained.

This joined body is transformed into a diamond tool by removing residual metallic silicon from its surface and, if necessary, by grinding the surface into a desired dimension.

The diamond tool formed by this method generates little vibrations even during machining a soft material (for example, aluminum, brass, or oxygen-free copper, etc.), and can sufficiently withstand use at high temperatures (for example, 1300° C. to 1400° C.), and has a long life. According to the above-described method, it also becomes possible to produce the diamond tool with good yield.

BRIEF DESCRIPTION OF THE DRAWINGS

The invention will now be described in detail with reference to the accompanying drawings wherein.

DETAILED DESCRIPTION OF PREFERRED EMBODIMENTS

Embodiments of this invention are illustrated in the following examples which are not to be considered limitative, since it is possible to transform and modify in a variety of ways based on the technical idea of this invention.

EXAMPLE 1

Commercially available artificial diamond powders of the four grades, namely, of the particle sizes of 149 to 177 micrometers, 88 to 105 micrometers, 37 to 44 micrometers and 12 to 15 micrometers, and a novolak type phenol resin as a carbon source were weighed to obtain a gross weight of 4 grams according to the mixing ratios shown in the Table 1, and were mixed in a mortar. Then the mixed ingredients were mold-formed under a compacting pressure of 1000 Kg/cm². After that, the compacts were defatted and carbonized by heating at 750° C. for 60 minutes in a vacuum furnace, and rectangular parallelpipeds of 3×5×5 mm were cut off therefrom. The cut off rectangular parallelpipeds were permeated with molten silicon and reaction-sintered in a vacuum furnace. After being taken from the furnace, they were ground to remove excess silicon and used as test pieces for measuring the coefficient of thermal expansion. The thermal expansion coefficients of the test pieces were measured from normal temperature to 700° C. or 900° C. by using a high speed differential thermal analysis apparatus, DT-7000 RH, manufactured by Shinku-riko K.K.

The measured results are shown in Table 1. In Table 1, the measured results of a conventional reaction-sintered silicon carbide (abbreviated as SiC) and diamond chip (abbreviated as DIA) are also shown.

The ingredient powder of mixing No. 6 in Table 1, which turned out to result in a thermal expansion coefficient closest to that of a diamond chip, was weighed so as to obtain a gross weight of 23 grams and mixed in a mortar. The mixed ingredients were mold-formed to be 12×12×60 mm, then defatted and carbonized by heating at 750° C. for 60 minutes, and processed to form a shank material of 10×10×50 mm.

Figure 1:
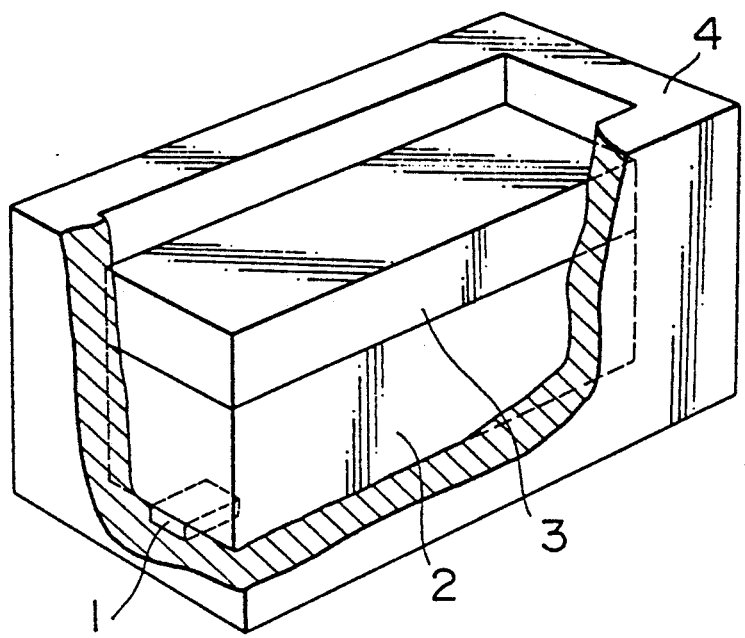
FIG. 1 is a cutaway perspective view for describing a method for producing a diamond tool according to the invention.

In FIG. 1, numerals 1, 2, 3 and 4 represent a diamond chip, the shank material, metallic silicon and a molding box, respectively.

First, a rectangular parallelpiped hole of 2 mm width, 1 mm depth and 3 mm length was formed at the bottom edge of the inside of the boron nitride-composed molding box 4 having the inside dimension of 10 mm width, 10 mm height and 50 mm length.

Then the single crystal diamond 1 of 2 mm width, 1 mm height and 3 mm length which had been ground beforehand with consideration given to the crystal orientation was inserted into this hole.

The shank material 2 was inserted into the molding box 4 so as to contact with the above-described inserted single crystal diamond 1, and 12 grams of metallic silicon 3 was filled thereon.

It was heated as it was at 1500° C. for 60 minutes in a vacuum furnace, and thereby the metallic silicon powder was allowed to melt and permeate into the shank material 2. The permeated silicon reacted with carbon in the shank material to form a reaction-sintered silicon carbide material containing diamond granule and having a thermal expansion coefficient similar to that of the diamond chip.

TABLE 1

| Mixing No. | Composition (by weight parts) | | | | | Thermal expansion coef. ($10^{-6}$ °C.$^{-1}$) | |
|---|---|---|---|---|---|---|---|
| | Diamond powder (μm) | | | | Phenol resin | Room temp. to 700° C. | Room temp. to 900° C. |
| | 149 to 177 | 88 to 105 | 37 to 44 | 12 to 15 | | | |
| SiC | | | | | | 2.5 | 2.8 |
| DIA | | | | | | | |
| 1 | 60 | | | 40 | 10 | 3.4 | 3.6 |
| 2 | 70 | | | 30 | 10 | 3.3 | |
| 3 | 80 | | | 20 | 10 | 3.2 | 3.5 |
| 4 | | 65 | | 35 | 10 | 3.0 | 3.2 |
| 5 | | 70 | | 30 | 10 | 3.3 | 3.4 |
| 6 | | 75 | | 25 | 10 | 2.9 | 3.0 |
| 7 | | 80 | | 20 | 10 | 3.1 | 3.4 |
| 8 | | | 100 | | 10 | 2.9 | 3.2 |
| 9 | | | | 100 | 10 | 3.1 | 3.1 |

Figure 2:
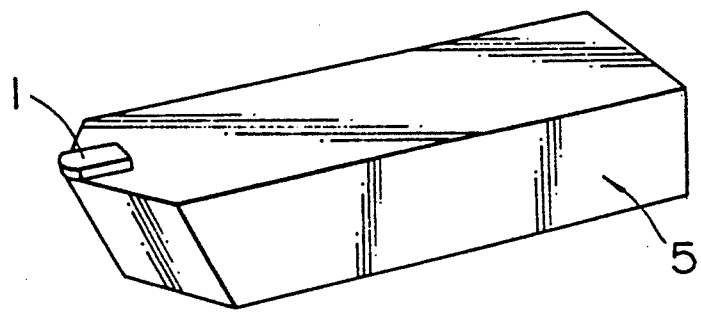
FIG. 2 is a perspective of a diamond tool according to the invention.

Then it was cooled, released from the mold, ground to remove excess metallic silicon sticking on the shank portion, and processed into the dimension of a product, to produce the diamond bit shown in FIG. 2.

Observation of a junction plane between the diamond chip 1 and shank 5 indicated no cracks at all. In addition, observation of the vicinity of the joint using an ultrasonic image device (immersion testing, 25 MHz) also indicated no cracks at all.

EXAMPLE 2

As an ingredient powder for forming a reaction-sintered silicon carbide material, 75 parts by weight of SiC powder of #1500, 25 parts by weight of SiC powder of #6000, 10 parts by weight of graphite powder and 25 parts of phenol resin were weighed and mixed in a mortar.

This ingredient powder and the ingredient powder of mixing No. 6, having shown a thermal expansion coefficient closest to that of the diamond chip in Example 1, were mixed in weight ratios of 4 to 0, 3 to 1, 2 to 2, 1 to 3 and 0 to 4. They, in that order, will hereinafter be referred to as mixing Nos. 6-0, 6-1, 6-2, 6-3 and 6-4 (mixing No. 6-4 is the same as mixing No. 6).

The five kinds of the ingredient powders of mixing Nos. 6-0 to 6-4 were mold-formed in the dimension of $12 \times 12 \times 60$ mm under a molding pressure of 1000 $Kg/cm^2$, and then were defatted and carbonized at 750° C. for 60 minutes to obtain shank materials.

Figure 3:
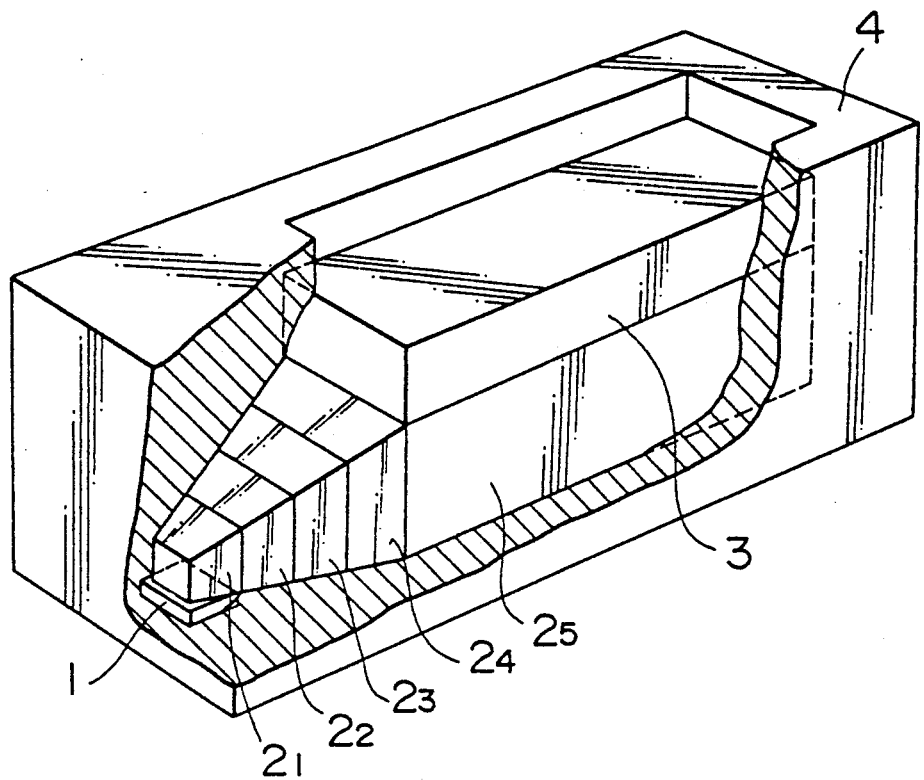
FIG. 3 is a cutaway perspective view for describing a further method for producing a diamond tool according to the invention.

As shown in FIG. 3, a rectangular parallelpiped hole of 3 mm width, 1.5 mm height and 3 mm length was installed on the bottom edge of the inside of the boron nitride-composed molding box 4 having the inside dimension of 10 mm width, 10 mm height and 70 mm length.

Then the single crystal diamond 1 of 3 mm width, 1.5 mm height and 3 mm length which had been previously ground with consideration given to the crystal orientation was inserted into the hole.

First, the shank material $2_1$ of mixing No. 6-4 was cut off by the length of 5 mm and inserted so as to come in contact with the single crystal diamond.

Next, the shank material $2_2$ of mixing No. 6-3 was similarly cut off by the length of 5 mm and inserted so as to come in contact with the material of mixing No. 6-4 inserted first.

In the exactly same way, the shank materials $2_3$ and $2_4$ of mixing No. 6-2 and 6-1, respectively, were cut off by the length of 5 mm and were inserted into the molding box 4.

Finally, the shank material $2_5$ of the mixing No. 6-0 was cut off by the dimension of $10 \times 10 \times 50$ mm and inserted into the molding box, and 12 grams of the metallic silicon powder 3 was filled thereon.

It was directly heated at 1500° C. for 60 minutes in a vacuum furnace and thereby the metallic silicon powder 3 was allowed to melt, permeate into the shank material 2 and react with it.

Figure 4:
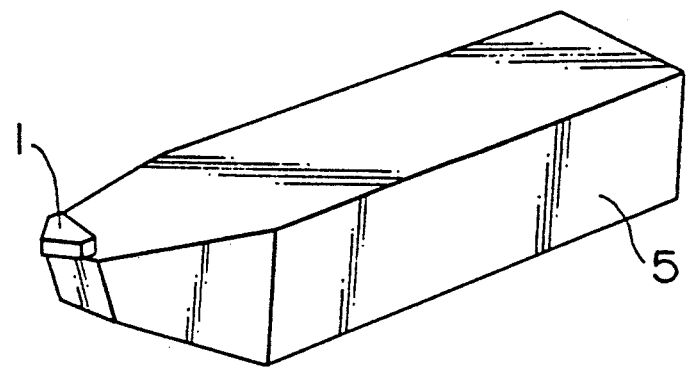
FIG. 4 is a perspective of a further embodiments of a diamond tool according to the invention.

After that, it was cooled, released from the mold, ground to remove excess metallic silicon sticking on the shank portion, and processed into a product dimension to obtain the diamond bit 5 shown in FIG. 4.

The diamond bit thus obtained had the shank 5 made of a functionally gradient material which has such a varying composition that the thermal expansion coefficient is close to that of the diamond chip (close to mixing No. 6-4) near the diamond chip, and with parting from the diamond chip, it changes to a value close to that of the reaction-sintered silicon carbide material.

Observation of a junction plane between the diamond chip 1 and shank material $2_1$ and of each junction plane from shank materials $2_2$ to $2_5$ indicated no cracks at all.

In this example, by letting the shank portion have an inclined functionality, not only was it possible to minimize the mixing amount of diamond contained in the shank portion and reduce material costs, but also grinding and processing became easy with the lower hardness of the shank.

I claim:

1. A diamond tool comprising:
a diamond chip; and
a shank having a portion thereof bonded to said diamond chip, said shank comprising a reaction-sintered silicon carbide material containing diamond granules so that at least said portion of said shank bonded to said diamond chip has a thermal expansion coefficient close to the thermal expansion coefficient of said diamond chip.

2. A diamond tool as claimed in claim 1 wherein:
said shank further comprises an ingredient layer comprising a carbon source having silicon permeated therein so that said silicon reacts with said carbon source to produce said reaction-sintered silicon carbide.

3. A diamond tool as claimed in claim 2 wherein:
said carbon source comprises a material selected from the group consisting of graphite, carbon black, a carbonaceous organic compound which converts to a carbon source upon heating, and mixtures thereof.

4. A diamond tool as claimed in claim 3 wherein:
said ingredient layer further comprises silicon carbide granules.

5. A diamond tool as claimed in claim 1 wherein:
said reaction-sintered silicon carbide material comprises at least 85% by weight of diamond granules.

6. A diamond tool as claimed in claim 3 wherein:
said reaction-sintered silicon carbide material comprises at least 85% by weight of diamond granules.

7. A diamond tool as claimed in claim 1 wherein:
said diamond chip comprise a single diamond selected from the group consisting of a single crystal and a sintered diamond.

8. A diamond tool as claimed in claim 3 wherein:
said diamond chip comprise a single diamond selected from the group consisting of a single crystal and a sintered diamond.

9. A diamond tool as claimed in claim 4 wherein:
said diamond chip comprise a single diamond selected from the group consisting of a single crystal and a sintered diamond.

10. A diamond tool as claimed in claim 5 wherein:
said diamond chip comprise a single diamond selected from the group consisting of a single crystal and a sintered diamond.

11. A diamond tool as claimed in claim 1 wherein:
said diamond granules are contained in varying reduced amounts in said reaction-sintered silicon carbide material proportional to the distance from said diamond chip so that said thermal expansion coefficient of said shank is reduced in proportion to the distance from said diamond chip.

12. A diamond tool as claimed in claim 3 wherein:
said diamond granules are contained in varying reduced amounts in said reaction-sintered silicon carbide material proportional to the distance from said diamond chip so that said thermal expansion coefficient of said shank is reduced in proportion to the distance from said diamond chip.

13. A diamond tool as claimed in claim 6 wherein:
said diamond granules are contained in varying reduced amounts in said reaction-sintered silicon carbide material proportional to the distance from said diamond chip so that said thermal expansion coefficient of said shank is reduced in proportion to the distance from said diamond chip.

14. A diamond tool as claimed in claim 11 wherein:
said diamond chip comprise a single diamond selected from the group consisting of a single crystal and a sintered diamond.

15. A method of making a diamond tool having a shank portion and a diamond chip bonded thereto, comprising:
providing a diamond chip;
mixing diamond granules and a carbon source material to form an ingredient layer of material containing said mixture;
placing a portion of said ingredient layer in contacting relationship with said diamond chip;
placing a metallic silicon powder over a surface of said ingredient layer; and
heating said ingredient layer to melt said metallic silicon powder and permeate molten silicon in said ingredient layer, react said molten silicon with said carbon source material to form silicon carbide, and form a shank portion bonded to said diamond chip;
so that a reaction-sintered silicon carbide material is formed in said shank portion having a thermal expansion coefficient, at least in the portion of said shank portion in contact with said diamond chip, close to the thermal expansion coefficient of said diamond chip.

16. The method as claimed in claim 15 and further comprising:
providing a mold;
placing said diamond chip in said mold;
placing said ingredient layer in said mold;
placing said metallic silicon powder in said mold on an upper surface of said ingredient layer; and
carrying out said heating step in an atmosphere comprising at least one of a vacuum and a non-oxidizing atmosphere.

17. The method as claimed in claim 16 and further comprising:
mixing silicon carbide granules with said carbon source material and said diamond granules to form said ingredient layer.

18. A diamond tool as claimed in claim 16 wherein:
said carbon source comprises a material selected from the group consisting of graphite, carbon black, a carbonaceous organic compound which converts to a carbon source upon heating, and mixtures thereof.

19. A diamond tool as claimed in claim 16 wherein:
said diamond granules are contained in varying reduced amounts in said reaction-sintered silicon carbide material proportional to the distance from said diamond chip so that said thermal expansion coefficient of said shank is reduced in proportion to the distance from said diamond chip.

20. A diamond tool as claimed in claim 5 wherein:
said reaction-sintered silicon carbide material comprises at least 85% by weight of diamond granules.

* * * * *